Aug. 22, 1961  G. H. N. BESSETTE  2,997,153
CONVEYOR CHAIN LIFTING DEVICE
Filed Jan. 4, 1960  2 Sheets-Sheet 1

INVENTOR
Georges H. N. BESSETTE

ATTORNEYS

Aug. 22, 1961  G. H. N. BESSETTE  2,997,153
CONVEYOR CHAIN LIFTING DEVICE
Filed Jan. 4, 1960  2 Sheets-Sheet 2

INVENTOR
Georges H.N. BESSETTE
BY
ATTORNEYS

United States Patent Office 2,997,153
Patented Aug. 22, 1961

2,997,153
CONVEYOR CHAIN LIFTING DEVICE
Georges Henri N. Bessette, Rte. 2, Iberville, Quebec, Canada
Filed Jan. 4, 1960, Ser. No. 122
9 Claims. (Cl. 198—1)

The present invention relates to stable cleaners of the type comprising an endless conveyor chain having flights secured thereto and running in a trough located behind the stalls. In conveyors of this type, a portion of the trough is continued outside the stable as a ramp from the end of which the manure is dumped onto a pile. In the winter, the portion of chain conveyor lying on the ramp has a tendency to freeze onto the bed of the trough, so that difficulties are experienced in starting the conveyor chain.

The invention obviates this disadvantage by providing means whereby the chain conveyor portion, which is outside the stable, may be stored, when not in use, at a slight distance above the bed of the trough. It is the main object of the present invention to provide a device whereby the chain may be moved from its operative position to its storage position and vice versa without any considerable effort, by making use of the force exerted by the driven chain to bring the chain to operative position, and by making use of the tension of the chain when storing it.

In accordance with the invention, the sprocket-wheel which is located at the intersection of the ramp and of the adjacent horizontal portion of the trough, and which is adapted to retain the chain conveyor against the bed of the trough, is rotatably mounted on a bearing which, in turn, is pivoted eccentrically on a fixed support. The sprocket-wheel and bearing assembly may therefore be selectively brought to a position close to or remote from the bed of the trough.

Starting from the storage position, the sprocket-wheel and the bearing are blocked together and the chain is started, thus pivoting the sprocket-wheel and bearing assembly to the operative position in which the axis of rotation of the sprocket-wheel is slightly over-center with respect to the pivotal axis of the bearing. Once the sprocket-wheel finds itself in this position, it is allowed to rotate freely on the bearing.

To return the device to storage position, all that is necessary is to pivot the bearing back past the over-center position, whereafter the tension of the chain causes the sprocket-wheel and bearing assembly to move up to the storage position.

In a more simplified arrangement, in which the sprocket wheel is replaced by a non-rotatable wheel acting as a slide, no blocking means need to be provided; in this case the slide wheel is directly pivoted eccentrically to a fixed support, and may be moved between the storage position, and the operative position, in which latter position the radial line from the contact point of the chain with the wheel is slightly over-center with respect to the pivotal axis of the slide-wheel.

Two embodiments of the invention are illustrated in the accompanying drawings, in which.

Figure 1:
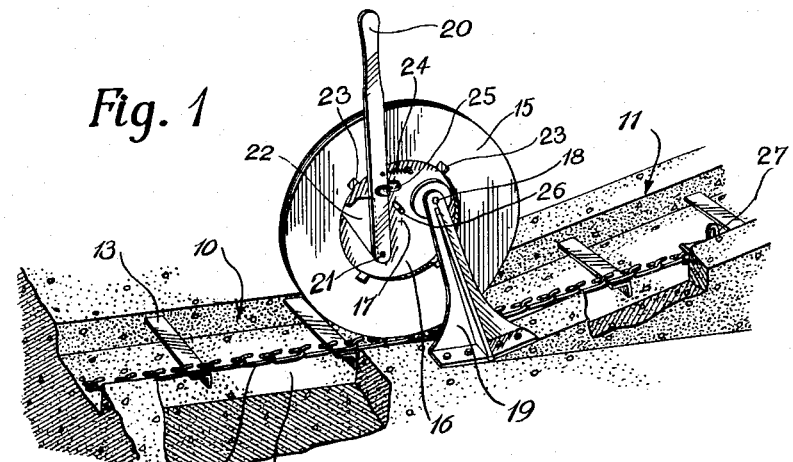
FIG. 1 is a perspective view of a first embodiment according to the present invention in storage position.
Figure 2:
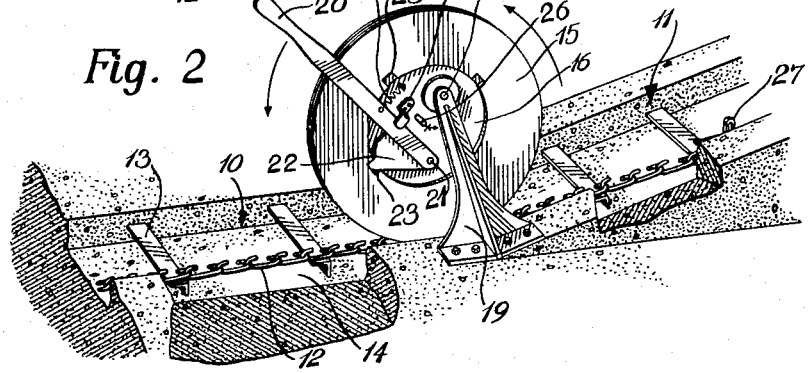
FIG. 2 is a perspective view of the device in an intermediate position, as it moves down to operative position.
Figure 3:
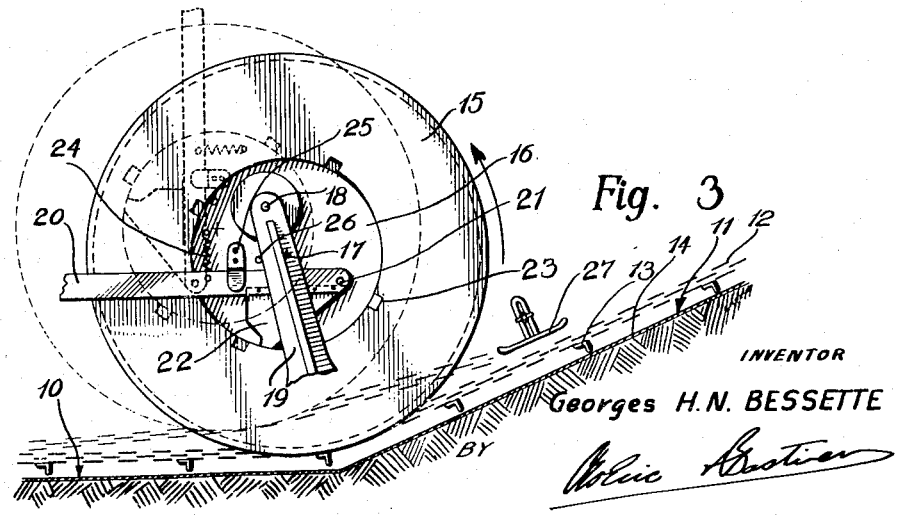
FIG. 3 is an enlarged elevation of the device in operative position of the chain conveyor, the storage position being indicated in dotted lines.

With reference to FIGS. 1 to 3, only a short section of the trough on either side of the chain lifting device is shown. The trough comprises a horizontal portion 10, and a ramp 11. The conveyor itself is of conventional construction and comprises a chain 12 to which are secured transverse flights 13, which are normally in contact with the bed 14 of the trough.

The chain engages the periphery of a sprocket wheel 15, which is rotatably mounted on a disc 16 which acts as a bearing for the sprocket wheel 15. The center of rotation of sprocket wheel 15 is indicated by a small cross 17.

The disc 16 is eccentrically pivoted at 18 on a post 19 located at the intersection of the horizontal trough portion 10 and of the ramp 11.

A lever 20 is pivotally mounted at its end on the disc 16, at a point 21 thereof remote from the pivot 18. The lever 20 has secured thereto a tooth 22, engageable with notches 23 on the inner periphery of the sprocket wheel 15; the drawing shows four notches 23, although one is sufficient; however, any number of notches 23 may be provided.

The lever 20 is urged out of engagement with notches 23 by a spring 24 attached to the disc 16, and which draws the lever 20 against an abutment 25 secured to the disc 16.

A finger 26 which acts as a stop, projects from the disc 16 and is engageable with the post 19.

The operation of the device is as follows:

Starting from the storage position shown in FIG. 1, in which the flights 13 are not in contact with the bed 14, of the trough, the conveyor is started so that the chain 12 causes the sprocket wheel 15 to rotate with respect to the disc 16. Manual pressure is then applied to the free end of lever 20, to overcome the resistance of spring 24, so that the tooth 22 slides on the inner periphery of the sprocket wheel 15 until said tooth engages one of the notches 23, thus blocking the sprocket wheel 15 with respect to the disc 16. When this happens, the chain 12 causes the sprocket wheel and disc assembly to pivot downwardly and forwardly in the direction of movement of the chain, as shown by arrows in FIGURE 2, thus substantially aiding the manual turning effort applied to lever 20, until the finger 26 engages the post 19, as shown in FIGURE 3.

The sprocket wheel has thus reached the operative position in which the flights 13 are in contact with the bed 14 of the trough; in this position the center 17 is beyond a line joining the pivot 18 of the disc and the point of contact of the chain 12 with the periphery of the sprocket wheel 15, which point of contact is directly above the intersection of the trough 10 and the ramp 11. Thus when the conveyor is stopped, the tension of the chain 12 securely keeps the sprocket wheel and disc assembly in operative condition. It is noted that as soon as the stop 26 comes in contact with the post 19, the operator should let go of the lever 20 so that the tooth 22 is disengaged from the corresponding notch 23 and the sprocket wheel 15 may then idle freely.

When it is desired to store the chain in raised position the lever 20 is forced upwardly against the abutment 25 so as to pivot the disc and sprocket wheel backwards until the center 17 is moved back past its over-center position; the tension of chain 12 thereafter causes the sprocket wheel and chain assembly to swing upwardly into the storage position of FIGURE 1.

An adjustable skate 27 is secured on the ramp wall at a certain distance from the sprocket wheel and disc assembly, to limit the upward movement of the chain.

Figure 4:
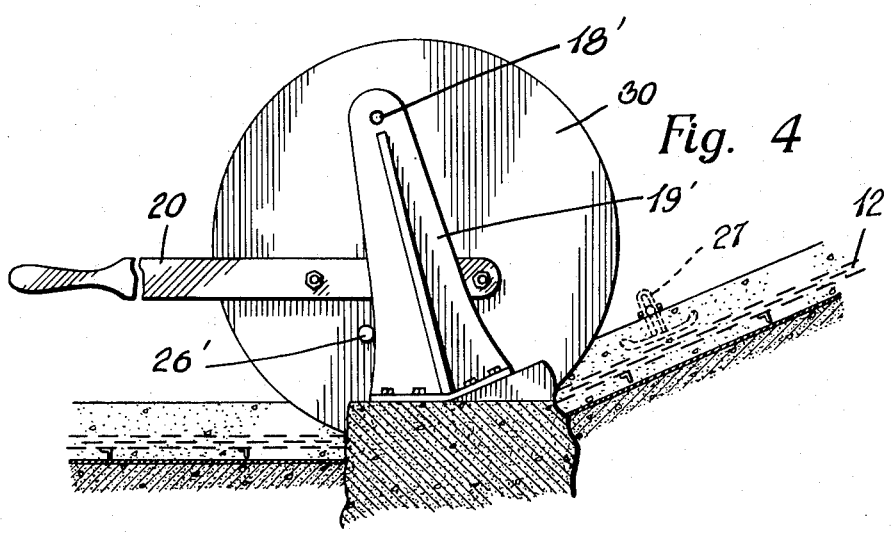
FIG. 4 is an elevation of a device according to a second simplified embodiment of the invention in the operative position.
Figure 5:
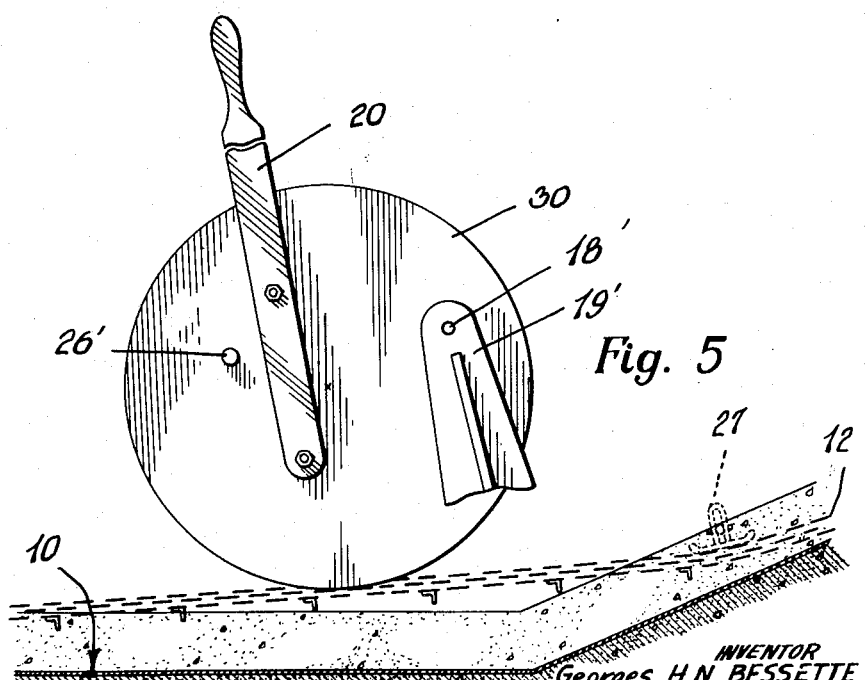
FIG. 5 is an elevation corresponding to FIG. 4, showing the device in storage position.

The second embodiment of the invention, illustrated in FIGS. 4 and 5, comprises a non-rotatable slide wheel 30 mounted eccentrically on a pivot 18' of a post 19'; a lever 20 is bolted to the slide wheel and a stop finger 26' projects from the slide wheel 30 and is engageable with the post 19'.

The operation is as follows: when it is desired to bring the slide wheel 30 to operative position from the storage position shown in FIG. 5, the chain is started, and pressure is applied manually to the free end of lever 20'. The chain frictionally engages the slide wheel and aids in moving the slide wheel to operative position. As in the first embodiment the limit position (FIG. 4) is determined by the finger 26' engaging the post 19', this position being over-centre with respect to the pivot 18'. Return to storage position is effected by forcing the lever in the opposite direction past the over-centre position, whereafter the tension of the chain takes over, as explained in connection with the first embodiment.

It will be understood that, while the first embodiment is more complex, it has the advantage of smoother operation due to the fact that a rotating sprocket wheel is provided. The second embodiment is of course cheaper to manufacture.

The embodiments illustrated and described above are given merely by way of example and various modifications are possible within the scope of appended claims; for example the tooth and notch arrangement of the first embodiment may be replaced by anyother suitable blocking or braking device.

I claim:

1. In an endless conveyor including a chain system having a conveyor driven in a given forward direction and comprising a portion thereof disposed along a vertically concave bed, in combination, a conveyor guide frictionally engaged by said chain having an at least partly circular portion, said guide being pivotable about a fixed axis offset from the centre of said circular portion, the chain of said conveyor effecting forward pivotal movement of said guide, and means limiting said forward pivotal movement of said guide to a position wherein said fixed axis is located above said centre and wherein said guide retains said conveyor on said concave bed.

2. The combination according to claim 1 comprising manually operated means operatively associated with said guide and positioned to exert on said guide a force effecting forward pivotal movement of said guide.

3. The combination according to claim 1 wherein in said position, said centre is disposed forwardly of a line joining said fixed axis and the point of contact of said guide with said conveyor.

4. In an endless conveyor system having a conveyor driven in a given forward direction and comprising a portion thereof disposed along a vertically concave bed, in combination, a guide wheel engaging and driven by said conveyor, a bearing for said guide wheel, said bearing being pivotable about a fixed axis offset from the axis of said wheel, means selectively blocking said guide wheel and bearing together whereby said conveyor effects forward pivotal movement of said bearing and guide wheel assembly, and means limiting said forward pivotal movement of said bearing and guide wheel assembly to a position wherein said fixed axis is located above said wheel axis and wherein said guide wheel retains said conveyor on said concave bed.

5. The combination according to claim 4 comprising manually operated means operatively associated with said bearing and with said blocking means to block said guide wheel and bearing together while exerting on said bearing a force effecting forward pivotal movement of said bearing.

6. In an endless conveyor system having a conveyor driven in a given forward direction and comprising a portion thereof disposed along a vertically concave bed, a guide wheel engaging and driven by said conveyor, a bearing for said guide wheel, said bearing being pivotable about a fixed axis offset from the axis of said wheel, a lever pivoted on said bearing at a point remote from said fixed axis, means secured to said lever, engageable with said guide wheel to block said guide wheel and bearing together when said lever is moved in a direction such as to effect forward pivotal movement of said bearing and guide wheel assembly, whereby said conveyor cooperates to effect said forward pivotal movement, and means limiting said forward pivotal movement of said bearing and guide wheel assembly to a position wherein said fixed axis is located above said wheel axis and wherein said guide wheel retains said conveyor on said concave bed.

7. In an endless chain conveyor system having a chain driven in a given forward direction and a bed comprising two generally straight portions making an angle to each other in a vertical plane, in combination, a sprocket wheel adjacent the intersection of said two straight portions of the bed, a disc the periphery of which serves as a bearing for said sprocket wheel, a fixed support, said disc being eccentrically mounted for pivotal movement on said fixed support, a lever pivoted at one end on said disc at a point remote from the pivotal axis of said disc, a tooth secured to said lever, notches on said sprocket wheel engageable by said tooth, a spring secured to said lever and to said disc urging said lever away from a position in which said tooth engages said notches, an abutment limiting said movement of said lever away from said position, said lever and tooth assembly being positioned to overcome said spring and engage said tooth in one of said notches when said lever is moved in a direction such as to effect forward pivotal movement of said disc and sprocket wheel assembly, whereby said chain co-operates to effect said forward pivotal movement, and a stop on said disc engageable with said fixed support to limit said forward pivotal movement of said disc and guide wheel assembly to a position wherein the axis of rotation of said sprocket wheel is located under the pivotal axis of said disc and slightly forward of a line joining said pivotal axis and the point of contact of said sprocket wheel with said chain and wherein said sprocket wheel retains said chain on said bed.

8. The combination of claim 7, further comprising an adjustable skate spaced from said sprocket wheel and disc assembly and overlying said chain, limiting the upward movement of said chain.

9. In an endless conveyor system having a chain driven in a given forward direction and a bed comprising two generally straight portions making an angle to each other in a vertical plane, in combination, a slide wheel adjacent the intersection of said two straight portions of the bed, said chain being adapted to frictionally engage said wheel, a fixed support, said wheel being eccentrically mounted for pivotal movement on said fixed support, a lever secured to said wheel at a point remote from the pivotal axis of said wheel, said lever being positioned to effect forward pivotal movement of said wheel, said chain when driven, cooperating to effect said forward pivotal movement, and a stop on said disc engageable with said fixed support to limit forward pivotal movement of said wheel to a position wherein the centre of said wheel is located under the pivotal axis of said wheel and slightly forward of a line joining said pivotal axis and the point of contact of said wheel with said chain and wherein said wheel retains said chain on said bed.

References Cited in the file of this patent

UNITED STATES PATENTS

| 1,913,040 | Pierson | June 6, 1933 |
| 2,872,022 | Klinzing | Feb. 3, 1959 |